No. 694,724. Patented Mar. 4, 1902.
A. T. BROWN.
GEARING.
(Application filed Oct. 23, 1901.)
(No Model.) 2 Sheets—Sheet 1.
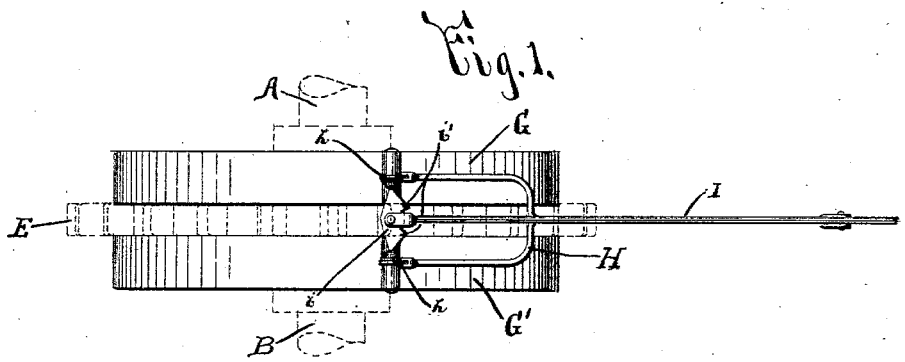
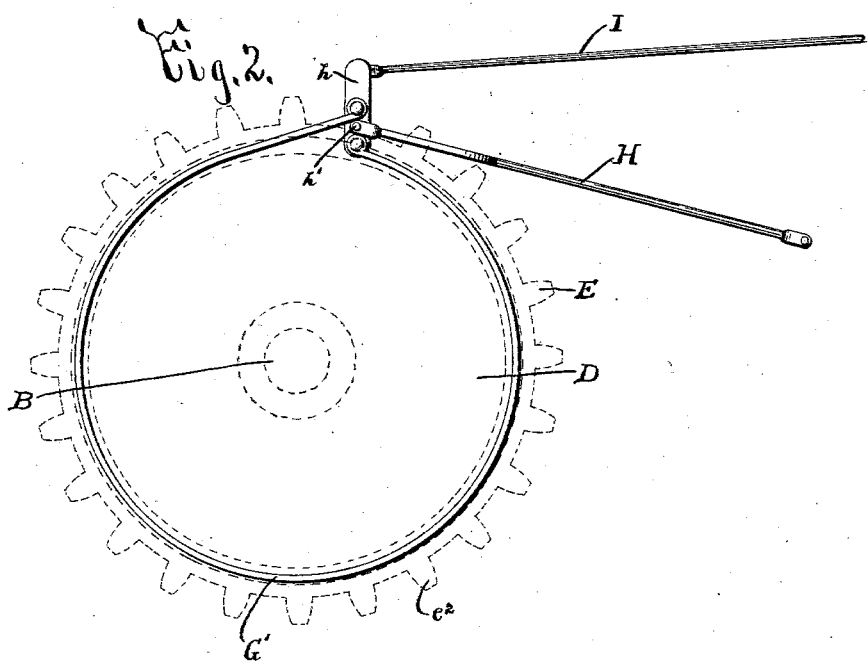
WITNESSES:
Chas. J. Foner.
Wm. T. Brewer.
INVENTOR
Alexander T. Brown.
BY
Hoyt Parsons.
ATTORNEYS No. 694,724. Patented Mar. 4, 1902.
A. T. BROWN.
GEARING.
(Application filed Oct. 23, 1901.)
(No Model.) 2 Sheets—Sheet 2.
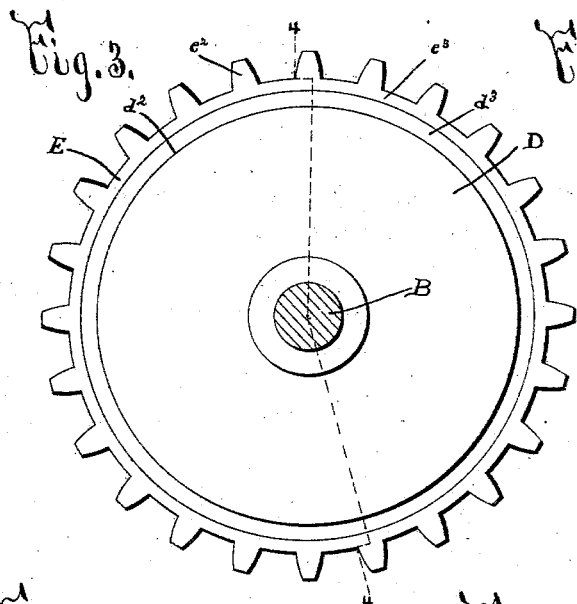
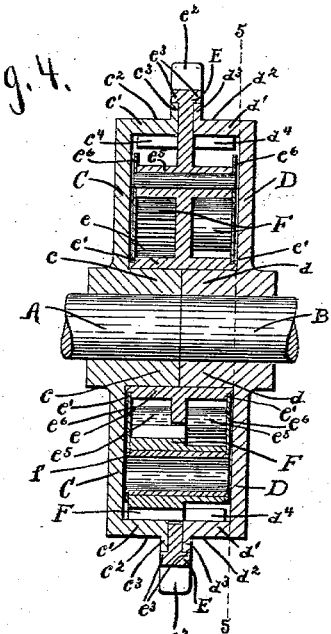
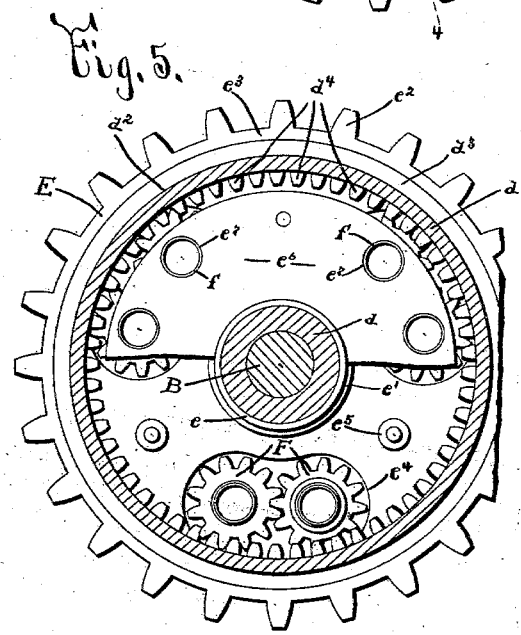
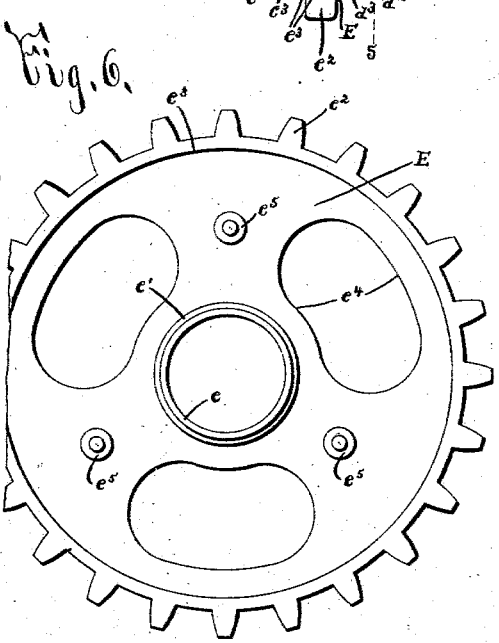
WITNESSES:
Chas. J. Foner.
Wm. T. Brewer.
INVENTOR
Alexander T. Brown.
BY
Hoyt & Parsons
ATTORNEYS

UNITED STATES PATENT OFFICE.

ALEXANDER T. BROWN, OF SYRACUSE, NEW YORK.

GEARING.

SPECIFICATION forming part of Letters Patent No. 694,724, dated March 4, 1902.

Application filed October 23, 1901. Serial No. 79,622. (No model.)

*To all whom it may concern:*

Be it known that I, ALEXANDER T. BROWN, of Syracuse, in the county of Onondaga and State of New York, have invented a certain new and useful Gearing, of which the following is a specification.

This invention has for its object the production of a gear, popularly termed a "differential" or "compensating" gear, which is particularly simple in construction, economical in manufacture, and efficient and durable in use; and to this end it consists in the devices and combinations hereinafter set forth and claimed.

Figures 1 and 2 are respectively top, plan, and side elevation of my differential gear, all of the parts except the brake members and their supporting and actuating means being shown by dotted lines. Fig. 3 is a side elevation of the portion of my differential gear illustrated by dotted lines in the preceding figures. Fig. 4 is a vertical sectional view taken on line 4 4, Fig. 3. Fig. 5 is a vertical sectional view, partly broken away, taken on line 5 5, Fig. 4. Fig. 6 is an elevation, partly broken away, of one of the detached power-transmitting members.

My differential gear comprises, essentially, two alined shafts A B, power-transmitting members C D E, gears F, brake members G G', and means for supporting and actuating the brake members. The shafts A B are of any desirable form, size, and construction, being here shown as arranged end to end. It is obvious, however, that one of said shafts may consist of a sleeve encircling a part of the other shaft. The power-transmitting members C D are fixed, respectively, to the shafts A B by any suitable means, (not illustrated,) and their opposing sides are provided with inwardly-projecting hubs $c\ d$ and with inwardly-projecting flanges $c'\ d'$, which are formed with peripheral engaging faces $c^2\ d^2$, peripheral projecting shoulders $c^3\ d^3$ at the inner sides of said faces $c^2\ d^2$, and toothed internal faces $c^4\ d^4$. Said power-transmitting member E is arranged concentric with the shafts A B, is movable independently thereof, and is formed with a hub $e$, which is loosely mounted on the hubs $c\ d$, closely fits between contiguous surfaces of the opposing sides of the power-transmitting members C D, and is provided at its ends with engaging faces $e'$. A portion of the power-transmitting member E is interposed between contiguous surfaces of the inwardly-projecting flanges $c'\ d'$ and the shoulders $c^3\ d^3$ and is preferably engaged with said surfaces for forming a substantially tight joint therewith. Said portion of the power-transmitting member E is usually formed with peripheral teeth $e^2$ and with shoulders $e^3$, lapped upon the peripheral faces of the shoulders $c^3\ d^3$. The flanges $c'\ d'$ and the interposed portion of the power-transmitting member E thus form the peripheral wall of a casing, which incloses the gears F, presently described, and is provided with an inner wall arranged concentric with said peripheral wall and composed of the hubs $c\ d$ and with opposite side walls composed of the main portions of the power-transmitting members C D. The power-transmitting member E is also provided with a plurality of substantially equidistant openings $e^4$, which extend through its side faces between the hub $e$ and the flanges $c'\ d'$, and with a plurality of arms $e^5$, which project from said side faces between the openings $e^4$, and are suitably fixed to plates $e^6$, arranged between opposing surfaces of the power-transmitting members C D and engaged with the faces $e'$ and with the end faces of the arms $e^5$.

The gears F are arranged in substantially equidistant pairs, one pair within each of the openings $e^4$, between opposing surfaces of the power-transmitting members C D, with their axes disposed substantially parallel with the shafts A B, are generally supported on spindles $f$, here shown as tubular and as having their ends arranged in openings $e^7$ in the plates $e^6$ and as expanded in the outer ends of said openings to secure the spindles in position, and the ends of each of said gears are usually extended beyond the side faces of the power-transmitting member E. Portions of the gears of each pair of said gears are engaged with each other, and additional portions thereof are respectively engaged with the internal toothed faces of the flanges $c'\ d'$. Said brake members G G' preferably consist of transversely-split bands, respectively encircling the engaging faces $c^2\ d^2$, and each having its opposite ends separated. The means for supporting the brake members G G' is here shown as a rod or link H having a forked rear end, and levers $h$, which are arranged at substantially right angles with the rod or link H, are pivoted or otherwise secured to the separated ends of the brake members G G', and are pivoted between the separated ends of the brake members at $h'$ to the branches of the forked end of the rod or link H. The means for actuating the brake members usually consists of a draw-bar or other actuating member I, arranged above the rod or link H, and a cross-bar or evener $i$, having its opposite ends arranged in sockets in the opposing sides of the levers $h$ and its intermediate portion pivoted to the draw-bar or actuating member I and provided with shoulders $i'$ for limiting the pivotal movement of said draw-bar or actuating member I relatively to the cross-bar or evener.

In the use of my invention the power-transmitting member E drives both shafts in the same direction, and either shaft is free to rotate independently of the other, and when it is desired to retard or prevent the operation of said shafts the draw-bar or actuating member I is drawn forwardly, clamping the brake members G G' upon the power-transmitting members C D, fixed to the shafts A B. As said brake members engage parts fixed to the shafts A B, the rotation of said shafts can be retarded or prevented even though the internal mechanism, as the gears F of my invention, becomes broken or inoperative, and in case one of the brake members should be inoperative the other may be relied upon.

The construction and operation of my differential or compensating gear will be readily understood upon reference to the foregoing description and the accompanying drawings, and it will be obvious to those skilled in the art that more or less change may be made in the construction and arrangement of its parts without departing from the spirit of my invention.

Having thus fully described my invention, what I claim as new, and desire to secure by Letters Patent, is—

1. The combination of two shafts, two power-transmitting members fixed respectively to the shafts and having opposing sides provided with toothed internal faces, a third power-transmitting member arranged between opposing surfaces of the first two power-transmitting members concentric with the shafts and movable independently thereof, said third power-transmitting member being formed with an opening extending through its side faces, and a pair of gears supported in the opening by the third power-transmitting member between opposing surfaces of the first two power-transmitting members and projecting beyond the side faces of the third power-transmitting member, said gears having their axes disposed substantially parallel with the shafts and being engaged with each other and respectively engaged with said toothed internal faces, substantially as and for the purpose described.

2. The combination of two shafts, two power-transmitting members fixed respectively to the shafts and having opposing sides provided with toothed internal faces, a third power-transmitting member arranged between opposing surfaces of the first two power-transmitting members concentric with the shafts and movable independently thereof, said third power-transmitting member being formed with an opening extending through its side faces, plates fixed to opposite sides of the third power-transmitting member between opposing surfaces of the first two power-transmitting members, and a pair of gears arranged in the opening of the third power-transmitting member and each having its ends extended beyond the side faces of the third power-transmitting member and supported by the plates, said gears having their axes disposed substantially parallel with the shafts and being engaged with each other and respectively engaged with said toothed internal faces, substantially as and for the purpose specified.

3. The combination of two shafts, two power-transmitting members fixed respectively to the shafts and having opposing sides provided with toothed internal faces, a third power-transmitting member arranged between opposing surfaces of the first two power-transmitting members concentric with the shafts and movable independently thereof, said third power-transmitting member being formed with an opening extending through its side faces and arms projecting from said side faces between opposing surfaces of the first two power-transmitting members, plates fixed to the arms between opposing surfaces of the first two power-transmitting members, and a pair of gears arranged in the opening of the third power-transmitting member and each having its ends extended beyond the side faces of the third power-transmitting member and supported by the plates, said gears having their axes disposed substantially parallel with the shafts and being engaged with each other and respectively engaged with said toothed internal faces, substantially as and for the purpose set forth.

4. The combination of two shafts, two power-transmitting members fixed respectively to the shafts and having opposing sides provided with toothed internal faces, a third power-transmitting member arranged between opposing surfaces of the first two power-transmitting members concentric with the shafts and movable independently thereof, said third power-transmitting member being formed with an opening extending through its side faces, arms projecting from said side faces between opposing surfaces of the first two power-transmitting members, and a hub having its ends provided with engaging faces, plates fixed to the arms between opposing surfaces of the first two power-transmitting members and engaged with said faces of the hub, and a pair of gears arranged in the opening of the third power-transmitting member and each having its ends extended beyond the side faces of the third power-transmitting member and supported by the plates, said gears having their axes disposed substantially parallel with the shafts and being engaged with each other and respectively engaged with said toothed internal faces, substantially as and for the purpose described.

5. The combination of two shafts, two power-transmitting members fixed respectively to the shafts and having opposing sides provided with toothed internal faces and inwardly-projecting hubs, a third power-transmitting member arranged between opposing surfaces of the first two power-transmitting members concentric with the shafts and loosely mounted on the inwardly-projecting hubs, said third power-transmitting member being formed with an opening extending through its side faces, and a pair of gears supported in the opening by the third power-transmitting member between opposing surfaces of the first two power-transmitting members and projecting beyond the side faces of the third power-transmitting member, said gears having their axes disposed substantially parallel with the shafts and being engaged with each other and respectively engaged with said toothed internal faces, substantially as and for the purpose specified.

6. The combination of two shafts, two power-transmitting members fixed respectively to the shafts and having opposing sides provided with toothed internal faces and inwardly-projecting hubs, a third power-transmitting member arranged between opposing surfaces of the first two power-transmitting members concentric with the shafts and loosely mounted on the inwardly-projecting hubs, said third power-transmitting member being formed with an opening extending through its side faces, plates fixed to opposite sides of the third power-transmitting member between opposing surfaces of the first two power-transmitting members, and a pair of gears arranged in the opening of the third power-transmitting member and each having its ends extended beyond the side faces of the third power-transmitting member and supported by the plates, said gears having their axes disposed substantially parallel with the shafts and being engaged with each other and respectively engaged with said toothed internal faces, substantially as and for the purpose set forth.

7. The combination of two shafts, two power-transmitting members fixed respectively to the shafts, a third power-transmitting member arranged concentric with the shafts and movable independently thereof, said third power-transmitting member having a portion thereof interposed between contiguous portions of the first two power-transmitting members and coöperating therewith to form an inclosing wall, and gears supported between the shafts and said inclosing wall and connecting the power-transmitting members, substantially as and for the purpose described.

8. The combination of two shafts, two power-transmitting members fixed respectively to the shafts and having their opposing sides provided with inwardly-projecting flanges, a third power-transmitting member arranged concentric with the shafts and movable independently thereof, said third power-transmitting member having a portion thereof interposed between contiguous surfaces of the inwardly-projecting flanges and forming a substantially tight joint therewith, and gears supported between the shafts and said flanges and connecting the power-transmitting members, substantially as and for the purpose specified.

9. The combination of two shafts, two power-transmitting members fixed respectively to the shafts and having their opposing sides provided with inwardly-projecting flanges, a third power-transmitting member arranged concentric with the shafts and movable independently thereof, said third power-transmitting member having a portion thereof interposed between contiguous surfaces of the inwardly-projecting flanges and forming a substantially tight joint therewith, and being formed with shoulders lapped upon contiguous peripheral surfaces of the flanges, and gears supported between the shafts and said flanges and connecting the power-transmitting members, substantially as and for the purpose set forth.

10. The combination of two shafts, two power-transmitting members fixed respectively to the shafts and having their opposing sides provided with inwardly-projecting flanges formed with peripheral projecting shoulders, a third power-transmitting member arranged concentric with the shafts and movable independently thereof, said third power-transmitting member having a portion thereof interposed between contiguous surfaces of the inwardly-projecting flanges and the peripheral shoulders thereof and being formed with shoulders lapped upon the peripheral shoulders of the flanges, and gears supported between the shafts and said flanges and connecting the power-transmitting members, substantially as and for the purpose described.

11. The combination of two shafts, two power-transmitting members fixed respectively to the shafts and having their opposing sides provided with inwardly-projecting hubs and flanges, a third power-transmitting member arranged concentric with the shafts and loosely mounted on the inwardly-projecting hubs, said third power-transmitting member having a portion thereof interposed between contiguous surfaces of the inwardly-projecting flanges and being formed with shoulders lapped upon contiguous peripheral surfaces of said flanges, and gears supported between the shafts and said flanges and connecting the power-transmitting members, substantially as and for the purpose specified.

12. The combination of two shafts, a power-transmitting member having a hub and recesses in opposite faces formed concentric with the hub, additional power-transmitting members having opposing sides provided with hubs projecting within the hub of the first power-transmitting member and respectively fixed to the shafts, said additional power-transmitting members having their opposing sides provided with flanges projecting into the recesses of the first power-transmitting member, and gears supported between the shafts and said flanges and connecting the power-transmitting members, substantially as and for the purpose set forth.

13. The combination of two shafts, two power-transmitting members fixed respectively to the shafts and having their opposing sides provided with inwardly-projecting flanges formed with toothed internal faces, a third power-transmitting member arranged concentric with the shafts and movable independently thereof, said third power-transmitting member being formed with an opening therein, and a pair of gears supported in the opening by the third power-transmitting member and having their axes disposed substantially parallel with the shafts, said gears being engaged with each other and respectively engaged with the toothed internal faces of the flanges, substantially as and for the purpose described.

14. The combination of two shafts, two power-transmitting members fixed respectively to the shafts and having their opposing sides provided with inwardly-projecting flanges formed with toothed internal faces, a third power-transmitting member arranged concentric with the shafts and movable independently thereof, said third power-transmitting member being formed with an opening therein and having a portion thereof interposed between contiguous surfaces of the inwardly-projecting flanges and forming a substantially tight joint therewith, and a pair of gears supported in the opening by the third power-transmitting member and having their axes disposed substantially parallel with the shafts, said gears being engaged with each other and respectively engaged with the toothed internal faces of the flanges, substantially as and for the purpose specified.

15. The combination of two shafts, two power-transmitting members fixed respectively to the shafts and having their opposing sides provided with inwardly-projecting hubs, and with inwardly-projecting flanges formed with toothed internal faces, a third power-transmitting member arranged concentric with the shafts and loosely mounted on the inwardly-projecting hubs, said third power-transmitting member being formed with an opening extending through its side faces, and having a portion thereof interposed between contiguous surfaces of the inwardly-projecting flanges, plates fixed to opposite sides of the third power-transmitting member, and a pair of gears arranged in the opening and supported by the plates, said gears having their axes disposed substantially parallel with the shafts and being engaged with each other and respectively engaged with the toothed internal faces of the flanges, substantially as and for the purpose set forth.

16. The combination of two shafts, two power-transmitting members fixed respectively to the shafts, gears connecting the power-transmitting members, brake members for respectively engaging the power-transmitting members, and means for actuating both the brake members, substantially as and for the purpose specified.

17. The combination of two shafts, two power-transmitting members fixed respectively to the shafts and formed with peripheral engaging faces, a third power-transmitting member arranged concentric with the shafts and movable independently thereof, said third power-transmitting member having a portion thereof interposed between the peripheral faces of the first power-transmitting member, gears supported by the third power-transmitting member and connecting said power-transmitting members, and brake members for respectively engaging said peripheral faces of the first two power-transmitting members, substantially as and for the purpose set forth.

18. The combination of two shafts, two power-transmitting members fixed respectively to the shafts and provided with peripheral engaging faces, said members having opposing sides provided with toothed internal faces, a third power-transmitting member arranged between opposing surfaces of the first two power-transmitting members concentric with the shafts and movable independently thereof, said third power-transmitting member being formed with an opening extending through its side faces, a pair of gears supported in the opening by the third power-transmitting member between opposing surfaces of the first two power-transmitting members and projecting beyond the side faces of the third power-transmitting member, said gears having their axes disposed substantially parallel with the shafts and being engaged with each other and respectively engaged with said toothed internal faces, and brake members for respectively engaging said peripheral faces of the first two power-transmitting members, substantially as and for the purpose described.

19. The combination of two shafts, two power-transmitting members fixed respectively to the shafts and having their opposing sides provided with inwardly-projecting hubs and with inwardly-projecting flanges formed with peripheral engaging faces and with toothed internal faces, a third power-transmitting member arranged concentric with the shafts and loosely mounted on the inwardly-projecting hubs, said third power-transmitting member being formed with an opening extending through its side faces and having a portion thereof interposed between contiguous surfaces of the inwardly-projecting flanges, plates fixed to opposite sides of the third power-transmitting member, a pair of gears arranged in the opening and supported by the plates, said gears having their axes disposed substantially parallel with the shafts and being engaged with each other and respectively engaged with the toothed internal faces of the flanges, and brake members for respectively engaging said peripheral faces of the inwardly-projecting flanges, substantially as and for the purpose described.

In testimony whereof I have hereunto signed my name, in the presence of two attesting witnesses, at Syracuse, in the county of Onondaga, in the State of New York, this 16th day of October, 1901.

ALEXANDER T. BROWN.

Witnesses:
D. LAVINE,
S. DAVIS.